United States Patent
Kim et al.

(10) Patent No.: US 8,074,885 B2
(45) Date of Patent: Dec. 13, 2011

(54) INTEGRATED RF CARD READER

(75) Inventors: Dae Seong Kim, Seoul (KR); Byeong Cheon Jeong, Gyeonggi-Do (KR); Hyun Soo Park, Seoul (KR); Kyung Hoon Kim, Seoul (KR); Min Gyu Maing, Seoul (KR); Dong Won Lee, Seoul (KR)

(73) Assignee: Samsung S.D.S. Co. Ltd. (KR)

( * ) Notice: Subject to any disclaimer, the term of this patent is extended or adjusted under 35 U.S.C. 154(b) by 0 days.

(21) Appl. No.: 12/901,098

(22) Filed: Oct. 8, 2010

(65) Prior Publication Data

US 2011/0024502 A1    Feb. 3, 2011

Related U.S. Application Data

(63) Continuation of application No. PCT/KR2009/001810, filed on Apr. 8, 2009.

(30) Foreign Application Priority Data

Apr. 10, 2008  (KR) .................. 10-2008-0033370

(51) Int. Cl.
*G06K 7/00* (2006.01)
(52) U.S. Cl. ......... 235/440; 235/380; 235/492; 235/451
(58) Field of Classification Search .................. 235/440, 235/380, 492, 451, 487, 480
See application file for complete search history.

(56) References Cited

U.S. PATENT DOCUMENTS

| | | |
|---|---|---|
| 2005/0015467 A1 | 1/2005 | Noda |
| 2006/0267768 A1 | 11/2006 | Sabeta |
| 2007/0003111 A1* | 1/2007 | Awatsu et al. ............... 382/115 |
| 2007/0043594 A1 | 2/2007 | Lavergne |
| 2009/0052667 A1* | 2/2009 | Iwamura .................... 380/200 |
| 2009/0065571 A1 | 3/2009 | Jain |

FOREIGN PATENT DOCUMENTS

| | | |
|---|---|---|
| KR | 1020040054603 A | 6/2004 |
| KR | 20070115130 A | 12/2007 |
| KR | 20080005632 A | 1/2008 |
| WO | 2008007871 A1 | 1/2008 |

OTHER PUBLICATIONS

International Search Report; PCT/KR2009/001810; Nov. 16, 2009; 3 pages.

Supplementary European Search Report; Application No. EP 09 72 9629; Date Mailed from the European Patent Office: Jun. 10, 2011; 8 pages.

* cited by examiner

*Primary Examiner* — Edwyn Labaze

(74) *Attorney, Agent, or Firm* — St. Onge Steward Johnston & Reens LLC

(57) ABSTRACT

An integrated RF card reader includes an integrated RF transmission unit including a Felica chip and a Felica security unit performing a security function that is needed to process a Felica type RF card where an RF function is removed. Since a variety of types can be embodied through a single RF transmission circuit by using the integrated RF card reader, a manufacturing cost can be reduced.

5 Claims, 3 Drawing Sheets

INTEGRATED RF CARD READER

CROSS-REFERENCE TO RELATED APPLICATIONS

The present application is a continuation of pending International patent application PCT/KR2009/001810 filed on Apr. 8, 2009 which designates the United States and claims priority from Korean patent application 10-2008-0033370 filed on Apr. 10, 2008, the content of which is incorporated herein by reference.

FIELD OF THE INVENTION

The present invention relates to an integrated RF card reader, and more particular, to an RF card reader which can perform an RF process of a non-contact card in addition to ISO-144434A/B (Mifare).

BACKGROUND OF THE INVENTION

In RF card readers using existing non-contact cards, in order to read cards of all types of ISO-144434A/B (Mifare), Felica, and NFC (near field communication), at least two RF transmission circuits or a separate analog circuit is needed.

Also, according to the conventional technology, to manufacture an integrated RF card reader, since two or more analog circuits for the ISO-144434A/B (Mifare), Felica, and NFC types are needed, the configuration of the circuits is complicated and interference of several RF signals is generated in an antenna. Practically, due to the above problems, the performance of the integrated RF card reader is deteriorated and the recognition distance of a card is shortened. Thus, when a user uses a card by carrying it in a bag, the card cannot be recognized.

SUMMARY OF THE INVENTION

Technical Problem

Also, in either way, since two or more analog circuits are needed for the ISO-144434A/B (Mifare), Felica, and NFC types, the configuration of the circuits is complicated and interference of several RF signals is generated in an antenna.

Technical Solution

However, the integrated RF card reader according to the present invention can address the above problem so that an antenna can be stably activated and an analog circuit can be simplified. Also, the integrated RF card reader has advantages such as a low manufacturing cost and a simple design in a field requiring process of a variety of non-contact cards in addition to a particular type non-contact card such as a transportation card system, an entrance management system, or an electronic ID system.

Advantageous Effects

A variety of types can be embodied through a single RF transmission circuit by using the integrated RF card reader, a manufacturing cost can be reduced.

DETAILED DESCRIPTION OF THE INVENTION

Best Mode

Figure 1:
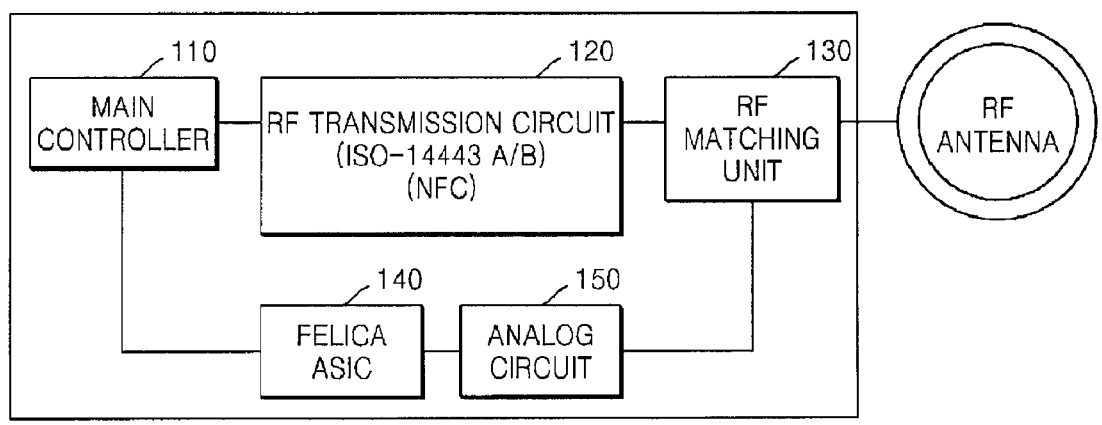
FIG. 1 illustrates a conventional integrated RF card reader.

To solve the above and/or other problems, the present invention provides an integrated RF card reader which can process a variety of card types including an ISO-144434A/B (Mifare) type, an Felica type, and an NFC type.

The present invention provides an RF card reader supporting various types by using an integrated RF transmission circuit.

According to an aspect of the present invention, an integrated RF card reader comprises an integrated RF transmission unit including a Felica chip, and a Felica security unit performing a security function that is needed to process a Felica type RF card where an RF function is removed.

A single RF output signal of the integrated RF transmission unit is transmitted to an antenna.

The Felica security unit has no RF signal process function.

The integrated RF transmission unit further comprises an ISO-144434A/B process unit and an NFC process unit.

The integrated RF transmission unit is embodied by a single circuit.

The integrated RF card reader further comprises an RF matching unit which matches a card process command modulated in a Felica type in the RF transmission unit and a card process command modulated in an ISO-144434A/B (Mifare) type or NFC type, to a single RF frequency.

Mode for Invention

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIG. 1 illustrates a conventional integrated RF card reader. Referring to FIG. 1, an integrated RF card reader includes a main controller 110, an RF transmission circuit 120, an RF matching circuit 130, a Felica ASIC 140, and an analog circuit 150.

As shown in FIG. 1, the integrated RF card reader is embodied by using at least two RF transmission circuits, that is, the RF transmission circuit 120 and the Felica ASIC 140, or the analog circuit 150 separately.

Also, when the analog circuit 150 is in use, the configuration of the analog circuit 150 is complicated and RF signal interferences occur because two or more analog circuits are needed for the embodiment of the analog circuit 150.

The RF transmission circuit 120 supports the ISO-144434A/B type and the NFC type only. This is because, in order to support the Felica type, a security process which is supported by the existing products needs to be performed. Thus, to support the Felica type in addition to the ISO- 144434A/B type and the NFC type, since the Felica ASIC 140 needs to be separately used, at least two RF circuits are needed.

In this case, however, since RF signals are output through not a single line but two lines, thus interferences are generated between the RF signals so that the RF signals are unstable and the outputs of the RF signal are lowered.

Figure 2:
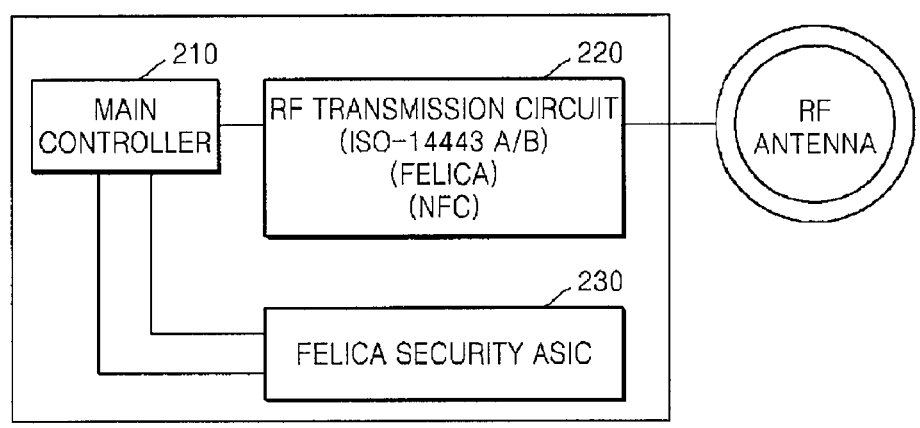
FIG. 2 illustrates an integrated RF card reader according to an embodiment of the present invention.

FIG. 2 illustrates an integrated RF card reader according to an embodiment of the present invention. Referring to FIG. 2, the integrated RF card reader (not shown) of the present embodiment includes a main controller 210, an RF transmission circuit 220, and a Felica security ASIC 230.

In the conventional technology, an Felica type card can be processed only when a security process that existing products support is performed. In the present embodiment, the Felica security ASIC 230 which is obtained by removing an RF support function from the conventional Felica ASIC 140 and embodies a security function only, is used. Thus, the at least two RF transmission circuits used to support the Felica type may be integrated into a single RF transmission circuit.

Since the Felica security ASIC 230 is used, the RF transmission circuit 220 of the integrated RF card reader of the present embodiment may support all of the ISO-144434A/B (Mifare) type, the Felica type, and the NFC type. In this case, in the embodiment of a chip used to support the Felica type in the RF transmission circuit 140, the chip can be embodied in the single RF transmission circuit 220 since the RF function is removed from the chip unlike the conventional chip.

Also, the integrated RF card reader may further comprise an RF matching unit matching a card process command modulated in the Felica type in the RF transmission circuit 220 and a card process command modulated in the ISO-144434A/B (Mifare) type or NFC type, to a single RF frequency. As a result of the above change, the integrated RF card reader can process all of the ISO-144434A/B (Mifare) type, the Felica type, and the NFC type with a single RF transmission circuit.

Figure 3A:
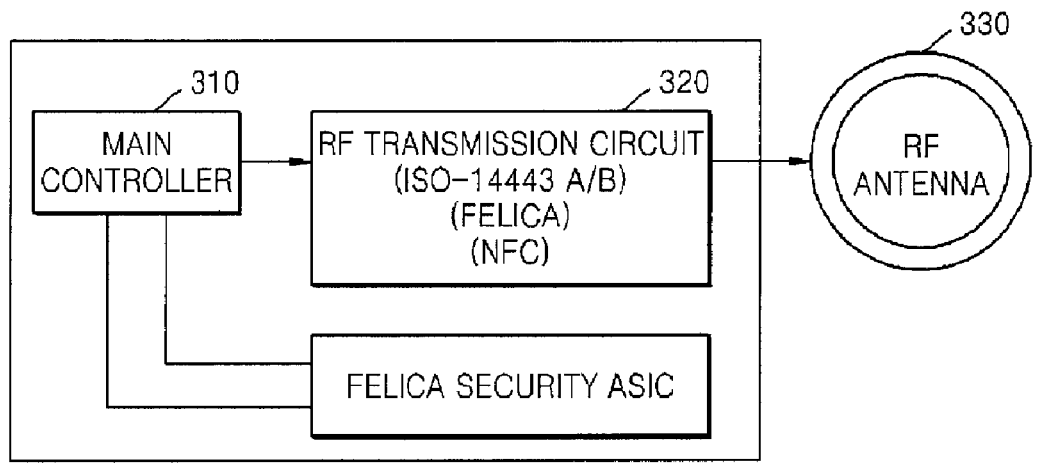
FIGS. 3A and 3B illustrate the structural diagrams where the ISO-144434A/B type and the NFC type are processed in the integrated RF card reader according to the present invention.
Figure 3B:
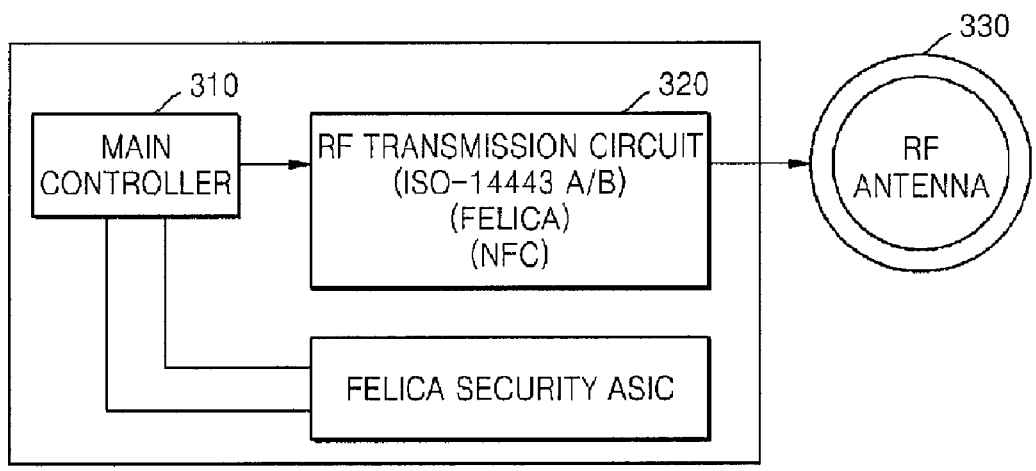

FIGS. 3A and 3B illustrate the structural diagrams where the ISO-144434A/B type and the NFC type are processed in the integrated RF card reader according to the present invention. Referring to FIG. 3, a main controller 310 of the integrated RF card reader of the present embodiment transmits a command to process a card of the ISO-144434A/B (Mifare) type or the NFC type to the single RF transmission circuit 320 and outputs a processed command to an RF antenna 330.

Figure 4:
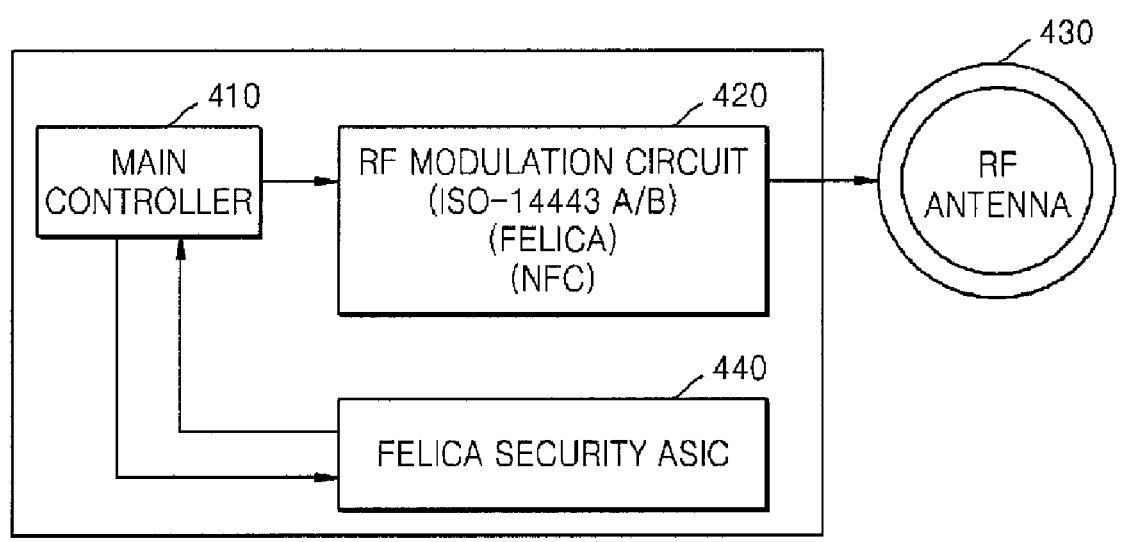
FIG. 4 illustrates the structural diagram where the Felica type is processed in the integrated RF card reader according to the present invention.

FIG. 4 illustrates the structural diagram where the Felica type is processed in the integrated RF card reader according to the present invention. Referring to FIG. 4, a Felica security ASIC 440 encodes a command needed to process a non-contact card of the Felica type. When a Felica type RF signal process is needed, a main controller 410 transmits a command to a Felica security ASIC 440 and receives an encoded command from the Felica security ASIC 440. Then, the main controller 410 transmits the encoded command to the single RF transmission circuit 420 and outputs a processed command to an RF antenna 430.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An integrated RF card reader comprising:
   an integrated RF transmission unit including a Felica chip;
   a Felica security unit performing a security function that is needed to process a Felica type RF card where an RF function is permanently incapacitated; and
   an RF matching unit which matches a card process command modulated in a Felica type in the RF transmission unit and a card process command modulated in an ISO-144434A/B (Mifare) type or NFC type, to a single RF frequency.

2. The integrated RF card reader of claim 1, wherein a single RF output signal of the integrated RF transmission unit is transmitted to an antenna.

3. The integrated RF card reader of claim 1, wherein all of the RF signal processing functionality of the Felica security unit is permanently incapacitated.

4. The integrated RF card reader of claim 1, wherein the integrated RF transmission unit further comprises an ISO-144434A/B process unit and an NFC process unit.

5. The integrated RF card reader of claim 1, wherein the integrated RF transmission unit is embodied by a single circuit.

* * * * *